United States Patent Office 3,400,113
Patented Sept. 3, 1968

3,400,113
MOLECULAR WEIGHT CONTROL OF POLYDIOLEFINS
Hermann Winter and Heinrich Weber, Marl, Germany, assignors to Chemische Werke Huls Aktiengesellschaft, Marl, Germany
No Drawing. Filed Dec. 23, 1963, Ser. No. 332,892
Claims priority, application Germany, Jan. 16, 1963, C 28,914, C 28,915
8 Claims. (Cl. 260—94.3)

ABSTRACT OF THE DISCLOSURE

For obtaining polydiolefins of controlled reduced molecular weights, the process of polymerizing a conjugated diolefin of 4–6 carbon atoms with a Ziegler catalyst, particularly one based on cobalt, and added thereto a nitrile, particularly an azo-bis-carboxylic acid nitrile, the more nitrile added to the catalyst composition, the lower the molecular weight of the polymer.

---

This invention relates to polymers of diolefins, in particular to the regulation of the molecular weight of the polymer when produced in the presence of a Ziegler-type catalyst.

It is known that during the polymerization of diolefins with Ziegler-type catalysts (reaction products of compounds of the transition metals on the one hand, and metals, metal hydrides, or metal-organic compounds of the metals of Groups I to III of Mendeleef's Periodic Table, on the other hand), the molecular weight of the polydiolefins thus produced can be regulated by performing the polymerization in the presence of hydrogen. It is also known that the molecular weights can be regulated by the addition of $\alpha$-olefins and non-conjugated diolefins. Finally, it is also possible to influence the molecular weights within certain limits by changing the composition of the inert solvents, especially of aliphatic and aromatic hydrocarbons.

Actually the polydiolefin molecular weights are lowered by additions of hydrogen, $\alpha$-olefins and non-conjugated diolefins and increased amounts of aliphatic compounds in the solvent mixtures. All of the preceding methods, however, involve difficulties. Some of them require the use of higher pressures or larger amounts of the regulating compounds. Certain of the regulators are difficult to obtain, and are effective only within a very narrow concentration range which is difficult to maintain.

The main object of this invention, therefore, is to provide an improved process for the regulation of the molecular weight of polymers of diolefins.

Another object is to provide novel catalyst compositions.

Upon further study of the specification and claims other objects and advantages of the present invention will become apparent.

It has been discovered that the molecular weights of polydiolefins obtained by the polymerization of diolefins with Ziegler-type catalysts preferably those catalysts composed on the one hand of compounds of the transition metals and on the other hand of metals, metal hydrides or metal organic compounds of the metals of Groups I to III of Mendeleef's Periodic Table, and optionally in the presence of inert solvents, can be advantageously regulated if the polymerization is performed in the presence of a small amount of a nitrile.

In other words, the essence of this invention is the addition of a nitrile to a Ziegler-type catalyst for the polymerization of diolefins. This nitrile is an organic compound containing at least one radical of the formula —C≡N wherein the free valence is satisfied by a substantially inert, if not completely inert, organic moiety. By "inert" is meant that the organic moiety reacts neither with the other components of the catalyst composition nor with the monomer itself. It is to be understood, however, that the nature of the organic moiety may be important with respect to the extent of molecular weight regulation, bearing in mind that if the organic compound contains at least one —C≡N group, there will be at least a finite regulation of the molecular weight.

Suitable nitriles, therefore, include the saturated and unsaturated aliphatic, cycloaliphatic and aromatic nitriles with one or more nitrile groups. Preferably, the aliphatic nitriles contain 2–16 carbon atoms, 1–4 nitrile groups, and 0 to 2 unsaturated bonds; still more preferably, the aliphatic moiety is hydrocarbon. The cycloaliphatic nitriles preferably contain 4 to 13 carbon atoms, 1–4 nitrile groups and 0 to 2 unsaturated bonds. Likewise, the aromatic nitriles preferably contain 7 to 15 carbon atoms, and 1–4 nitrile groups.

Specific examples of the nitriles of this invention include acetonitrile, propionitrile, butyronitrile, lauric acid nitrile, cyanogen, malonitrile, adipic acid nitrile, dihydromuconic acid nitrile, hexahydrobenzoic acid nitrile, benzonitrile, stearylnitrile, tetracyanoethane, cyclododecylnitrile, terephthalonitrile, phthalonitrile, $\beta$-naphthoic acid nitrile. Suitable $\alpha,\beta$ unsaturated nitriles include acrylonitrile, crotylonitrile, fumaric acid nitrile and muconic acid nitrile.

Highly preferred nitriles of this invention are azo-bis-carboxylic acid nitriles of the formula:

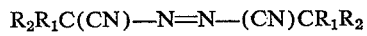

$$R_2R_1C(CN)-N=N-(CN)CR_1R_2$$

wherein $R_1$ and $R_2$ are aliphatic or cycloaliphatic residues with 1 to 6 carbon atoms, which may be in the form of a 6-atom ring. Examples of these nitriles include 2-azo-bis-isobutyric acid-nitrile, 2-azo-bis-2-methyl-butyric-acid-nitrile and 1-azo-bis-1-cyclohexane - carboxylic-acid-nitrile.

The nitriles of this invention are prepared, in general, by conventional methods, reference being made to any standard textbook of organic chemistry. With respect to the preparation of the azo-bis-carboxylic-acid-nitriles, we refer to Dox Am. Chem. Soc., 47, p. 1471 (1925); Overberger, Organic Synthesis, 32, p. 16 (1952).

The nitriles are used in 0.01 to 100 molar, and preferably in 0.1 to 10 molar amounts, relative to the amounts of the transition metal compounds. Generally, about equimolar amounts are used, the amount being determined by the desired reduction of molecular weight. The larger the amount of nitrile, the greater will be the reduction of the molecular weight. Nitriles are especially suitable for regulating the molecular weight of polybutadienes with high 1,4 contents, produced with mixed catalysts of cobalt compounds and aluminum organic compounds.

The diolefins that can be advantageously polymerized according to this invention are those having 4–6 carbon atoms, and of course the two double bonds must be conjugated. Hydrocarbon diolefins are preferred such as isoprene, pentadiene-(1,3) and butadiene-(1,3) and mixtures thereof. Furthermore, copolymers of one or more diolefins with one or more monolefins of 2 to 8 carbon atoms are included, as long as the mol ratio of diolefin to monolefin monomer is not less than 0.5:1, respectively. Preferred monolefins are hydrocarbons such as butene-(1) and butene-(2).

Suitable transition metal compounds include those of titanium as, for example, titanium tri- and tetrachloride and those of vanadium as, for example, vanadium trichloride, tetrachloride and oxytrichloride and vanadium-(III)-acetylacetonate. Especially suitable are the cobalt compounds such as cobalt chloride, cobalt bromide, cobalt acetate, -propionate, -butyrate, -octoate, -stearate or complex compounds of cobalt such as cobalt acetylacetonate.

As metals of Groups I to III of the Periodic Table, especially suitable are sodium, lithium and aluminum, while suitable metal hydrides include sodium hydride, calcium hydride, aluminum hydride and lithium-aluminum hydride. As metal organic compounds, those with metal-carbon bonds are suitable, such as metal organic compounds of the alkali metals as, for example, butyl-magnesium bromide and phenyl-magnesium bromide, and especially aluminum compounds as, for example, aluminum trialkyls, aluminum triaryls and aluminum triarylalkyls such as trimethylaluminum, triethyl aluminum, triisobutyl aluminum, triphenyl aluminum, tri-(ethylphenyl)-aluminum, and mixtures thereof; furthermore, also dialkyl aluminum-monohalides, diaryl - aluminum - monohalides and diaralkyl-aluminum-monohalides such as diethyl-aluminum-monochloride, diphenyl-aluminum - monochloride, diethylphenyl-aluminum-monochloride, diethyl-aluminum-monobromide, finally also the monoalkyl aluminum dihalides, monoaryl aluminum dihalides, monoaralkyl aluminum dihalides such as monoethyl aluminum dichloride and monoethyl aluminum dibromide. Also suitable are the dialkyl aluminum hydrides as, for example, diethyl aluminum monohydride, diisobutyl aluminum monohydride, etc. Also suitable are hydride of aluminum halides or their etherates, as, for example, hydride of aluminum dichloride.

The molar ratio of the transition metal compound to the Group I to III substance is in general about 5000:1 to 1:1, preferably 100:1 to 1000:1, respectively.

For additional disclosure of the various possible components of the Ziegler-type catalysts, reference is directed to Gaylord and Mark, "Linear and Stereoregular Addition Polymers," Polymer Review, vol 2, 1959, Interscience Publishers, N.Y. and London, pages 90–106.

It is to be appreciated that the essence of this invention is not in the selection of the individual components of the Ziegler-type catalyst, but rather in the addition to such a catalyst of the nitrile molecular weight regulator of his invention.

The nitriles can be added to the polymerizing materials either at the beginning of the process or during polymerization whereby any sequence of component additions can be maintained. It is advantageous, however, to add the nitriles to the solution or suspension of the catalyst mixture, and preferably in the same diluent.

The polymerization is suitably initiated by addition of the diolefin or diolefin mixture to a 0.01 to 25 percent, and preferably a 0.1 to 5 percent solution or suspension of the catalyst mixture in an inert diluent. As inert diluents, the hydrocarbons are to be given first consideration. Suitable for this purpose are the aliphatic, cycloaliphatic and aromatic hydrocarbons as, for example, butane, hexane, cyclohexane, isopropyl cyclohexane, benzene and toluene, as well as mixtures of aliphatic and cycloaliphatic or aliphatic or aromatic hydrocarbons as, for example, benzene fractions. Also, the halogenated hydrocarbons as, for example, carbon tetrachloride and chlorobenzene, can be used.

The polymerization can be performed at atmospheric pressure, at slightly lower pressure, or at higher pressures, although a pressure less than atmospheric is generally not required. On the other hand, a few atmospheres of positive pressure are generally advantageous.

The process is conducted at temperatures between −30 and 100° C., preferably between 0 and 50° C. During the reaction the mixture is agitated with the help of a suitable agitator. The heat of polymerization is removed by cooling from within or from without by means of a suitable cooling fluid, or by vaporization. Polymerization is stopped when a product is obtained which can no longer be agitated, or in a continuous process by the continual removal of catalyst containing polydiolefin solution in a known manner. The polymerized mixture is worked up in a known manner, as for example, by addition of ethanol, methanol or isopropanol, followed by filtration. Of special interest is the known method of working it up with water.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example 1

Into a vessel equipped with an agitator and sealed off against air and moisture there is added 1 liter anhydrous benzene, 108 g. (2 mols) butadiene-(1,3) containing 0.01% isobutane, 0.01% n-butane, 0.1% butene-(1) and isobutene and 0.05% trans-butene-(2); 0.4 g. (9.74 millimole) acetonitrile; 0.164 g. (0.46 millimole) cobalt acetylacetonate; and 2.48 (20 millimole) ethyl aluminum sesquichloride. An active polymerization commences, and the temperature is then kept between 20 and 25° C. by external cooling. After 1.5 hours the polymerization is terminated by adding acetone. The polybutadiene precipitated by the dropwise addition of alcohol, is washed, and then dried at 30° C. in a vacuum chamber. 100 g. polymer (93%) are obtained with an RV=1.6 (reduced viscosity=viscosity number, (see Makromolekulare Chemie 38, p. 9 (1960)) and a gel content of 3% (at 25° C. and at a concentration of 0.20 g./cm.$^3$ of polybutadiene, insoluble in toluene). Infrared analysis indicates that the polymer contains 95% 1,4-cis, 2% 1,4-trans and 3% 1,2 components.

Table 1 shows the relation of the RV values of the polybutadienes to the amount of added acetonitrile.

TABLE 1

| Acetonitrile g./mol butadiene | Yield, percent | RV | Gel, percent | Structure | | |
|---|---|---|---|---|---|---|
| | | | | 1,2 | 1,4-trans | 1,4-cis |
| | 80 | 5.2 | 3 | 1 | 1 | 98 |
| 0.006 | 86 | 4.5 | 1 | 1 | 1 | 98 |
| 0.020 | 88 | 4.0 | 0 | 1 | 1 | 98 |
| 0.033 | 90 | 3.2 | 0 | 1 | 1 | 98 |
| 0.066 | 94 | 2.4 | 1 | 2 | 1 | 97 |
| 0.200 | 93 | 1.6 | 3 | 3 | 2 | 95 |

Example 2

Example 1 is repeated, but instead of the acetonitrile, 0.13 g. (2.45 mmol) acrylonitrile are added. 101 g. polymer (94%) are obtained with an RV of 2.2 and a gel content of 0%. Infrared analysis indicates that the polymer contains 97% 1,4-cis, 1% 1,4-trans and 2% 1,2-polybutadiene.

Table 2 shows the relationship of the RV values of the polybutadienes to the amount of added acrylonitrile.

TABLE 2

| Acetonitrile g./mol butadiene | Yield, percent | RV | Gel, percent | Structure | | |
|---|---|---|---|---|---|---|
| | | | | 1,2 | 1,4-trans | 1,4-cis |
| | 80 | 5.2 | 3 | 1 | 1 | 98 |
| 0.006 | 81 | 4.1 | 2 | 1 | 1 | 98 |
| 0.020 | 85 | 3.3 | 1 | 1 | 1 | 98 |
| 0.033 | 84 | 3.0 | 0 | 1 | 1 | 98 |
| 0.066 | 94 | 2.2 | 0 | 2 | 1 | 97 |
| 0.200 | 99 | 1.8 | 2 | 3 | 2 | 95 |
| 0.333 | 95 | 0.36 | 3 | 4 | 3 | 93 |

Example 3

Example 1 is repeated except azo-bis-isobutyric acid nitrile is substituted for acetonitrile on a weight basis. 104 g. polymer (96.5%) are obtained with an RV of 2.0 (reduced viscosity=viscosity number, Macromolakulare Chemie 38, p. 9 (1960)). Its gel content is 3% (at 25° C.) and with a concentration of 0.20 g./cm.$^3$ in toluene in which it is insoluble. The polybutadiene contains, according to infrared analysis, 96% 1,4-cis, 2% 1,4-trans and 2% isomers.

The table shows the relation of the RV values of the polybutadiene to the amount of added azo-bis-isobutyric acid nitrile.

TABLE 3

| Azo-bis-isobutyric acid nitrile, m. mol/mol butadiene | Yield percent | RV | Gel percent | Structure | | |
|---|---|---|---|---|---|---|
| | | | | 1,2 | 1,4-trans | 1,4-cis |
| | 80 | 5.2 | 3 | 1 | 1 | 98 |
| 0.036 | 81 | 5.0 | 3 | 1 | 1 | 98 |
| 0.122 | 85 | 4.6 | 1 | 1 | 1 | 98 |
| 0.203 | 90 | 4.2 | 1 | 1 | 1 | 98 |
| 0.406 | 91 | 3.7 | 2 | 1 | 1 | 98 |
| 0.811 | 90 | 3.1 | 1 | 1 | 2 | 97 |
| 1.220 | 96 | 2.0 | 3 | 2 | 2 | 97 |
| 1.420 | 95 | 1.6 | 2 | 2 | 2 | 97 |
| 1.628 | 96 | 0.98 | 4 | 4 | 4 | 93 |
| 2.030 | 95 | 0.58 | 1 | 4 | 5 | 91 |

Example 1-3 are repeated, but instead of using ethyl aluminum sesquichloride, there are used with similar results any of sodium, lithium, aluminum, sodium hydride, calcium hydride, aluminum hydride, lithium-aluminum hydride, butyl-magnesium bromide, phenyl-magnesium bromide, trimethylaluminum, triethyl aluminum, triisobutyl aluminum, triphenyl aluminum, tri-(ethylphenyl)-aluminum, diethyl - aluminum - monochloride, diphenyl-aluminum - monochloride, diethylphenyl - aluminum-monochloride, diethyl - aluminum - monobromide, monoethyl aluminum dichloride, monoethyl aluminum dibromide, diethyl aluminum monohydride, diisobutyl aluminum monohydride, and hydride of aluminum dichloride.

The previous examples are repeated, but the cobalt acetylacetonate is replaced by any of the following transition compounds, again with similar results: titanium trichloride, titanium tetrachloride, vanadium trichloride, vanadium tetrachlorid,e vanadium oxytrichloride, vanadium-(III)-acetylacetonate, cobalt chloride, cobalt bromide, cobalt acetate, cobalt-propionate, cobalt-butyrate, cobalt-octoate, and cobalt-stearate.

The prior examples are repeated using as the molecular weight regulator any of the following: propionitrile, butyronitrile, lauric acid nitrile, cyanogen, malonitrile, adipic acid nitrile, dihydromuconic acid nitrile, hexahydrobenzoic acid nitrile, benzonitrile, crotylonitrile, fumaric acid nitrile, muconic acid nitrile, 2-azo-bis-2-methyl-butyric-acid-nitrile, and 1-azo-bis-1-cyclohexane-carboxylic-acid-nitrile.

Still further examples are obtained by replacing the butadiene-(1,3) monomer with another diolefin such as isoprene, pentadiene-(1,3).

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalents of the following claims.

What is claimed is:

1. A process for reducing the molecular weight of polydiolefins, which process comprises polymerizing a conjugated diolefin of 4-6 carbon atoms in contact with a catalyst composition consisting essentially of a reaction product of (1) a compound of a transition metal selected from the group consisting of titanium, vanadium and cobalt, and (2) a catalyst substance selected from the group consisting of a metal, a metal hydride, and a metal organic compound, said metal in each case being selected from the Groups I to III of Mendeleef's Periodic Table; and in addition to said reaction product, a molecular weight regulator of the formula:

$$R_2R_1C(CN)-N=N-(CN)CR_1R_2$$

wherein $R_1$ and $R_2$ are each selected from the group consisting of alkyl of 1-6 carbon atoms and cycloalkyl of not more than 6 carbon atoms, or $R_1$ and $R_2$ together represent a cyclohexane ring, the molar ratio of the molecular weight regulator to the transition metal compound being about 0.1:1 to 10:1, the more molecular weight regulator employed, the greater the decrease in the molecular weight of the polydiolefin.

2. The process of claim 1 wherein said molecular weight regulator is selected from the group consisting of 2-azo-bis-isobutyric-acid-nitrile, 2-azo-bis-2-methyl-butyric-acid-nitrile, and 1-azo-bis-1-cyclohexane-carboxylic-acid-nitrile.

3. The process of claim 2 wherein the transition metal compound is selected from the group consisting of titanium trichloride, titanium tetrachloride, vanadium trichloride, vanadium tetrachloride, vanadium oxytrichloride, vanadium-(III)-acetylacetonate, cobalt chloride, cobalt bromide, cobalt acetate, cobalt-propionate, cobalt-butyrate, cobalt-octoate, and cobalt stearate, and cobalt acetylacetonate.

4. The process of claim 2 wherein the transition metal compound is a hydrocarbon-soluble cobalt compound.

5. The process of claim 1 wherein the conjugated diolefin is butadiene.

6. The process of claim 2 wherein the conjugated diolefin is butadiene.

7. The process of claim 3 wherein the conjugated diolefin is butadiene.

8. The process of claim 4 wherein the conjugated diolefin is butadiene.

References Cited

UNITED STATES PATENTS 3,116,274 12/1963 Boehm et al. ———— 260—94.9
3,045,001 7/1962 Berger ———————— 260—94.9

FOREIGN PATENTS 213,051 1/1961 Austria.
1,131,409 6/1962 Germany.

JOSEPH L. SCHOFER, *Primary Examiner.*

JAMES A. SEIDLECK, *Examiner.*

E. J. SMITH, *Assistant Examiner.*